(12) United States Patent
Vaikar et al.

(10) Patent No.: US 11,579,913 B2
(45) Date of Patent: Feb. 14, 2023

(54) SYSTEM AND METHOD FOR OPTIMIZING NETWORK TOPOLOGY IN A VIRTUAL COMPUTING ENVIRONMENT

(71) Applicant: VMWARE, INC., Palo Alto, CA (US)

(72) Inventors: Amol Manohar Vaikar, Pune (IN); Avinash Nigam, Pune (IN)

(73) Assignee: VMware, Inc., Palo Alto, CA (US)

( * ) Notice: Subject to any disclaimer, the term of this patent is extended or adjusted under 35 U.S.C. 154(b) by 292 days.

(21) Appl. No.: 16/792,330

(22) Filed: Feb. 17, 2020

(65) Prior Publication Data

US 2021/0191746 A1 Jun. 24, 2021

(30) Foreign Application Priority Data

Dec. 18, 2019 (IN) .............................. 201941052602

(51) Int. Cl.
*G06F 9/455* (2018.01)
*H04L 12/24* (2006.01)
(Continued)

(52) U.S. Cl.
CPC ...... *G06F 9/45558* (2013.01); *H04L 41/0823* (2013.01); *H04L 41/0876* (2013.01);
(Continued)

(58) Field of Classification Search
CPC . H04L 41/0823; H04L 41/0876; H04L 43/08; H04L 41/083; G06F 2009/45595; G06F 2009/4557
(Continued)

(56) References Cited

U.S. PATENT DOCUMENTS 6,397,359 B1 * 5/2002 Chandra ................. H04L 43/50
709/224
8,660,129 B1 * 2/2014 Brendel .............. H04L 12/4641
370/397
(Continued)

FOREIGN PATENT DOCUMENTS

AU 2019261804 B2 * 1/2022 ......... G06K 9/00228
CN 101040262 A * 9/2007 ......... G06F 9/45558
(Continued)

OTHER PUBLICATIONS

K. A. Noghani, A. Kasslerand P. S. Gopannan, "EVPN/SDN Assisted Live VM Migration between Geo-Distributed Data Centers," 2018 4th IEEE Conference on Network Softwarization and Workshops (NetSoft), 2018, pp. 105-113, doi: 10.1109/NETSOFT.2018. 8459946. (Year: 2018).*

*Primary Examiner* — David R Lazaro
*Assistant Examiner* — Berhanu Shitayewoldetadik

(57) ABSTRACT

A computer network optimization methodology is disclosed. In a computer-implemented method, components of a computing environment are automatically monitored, and have a feature selection analysis performed thereon. Provided the feature selection analysis determines that features of the components are in frequent communication and generating network latency. Provided the feature selection analysis determines that features of the components are not well defined, a similarity analysis of the features is performed. Results of the feature selection methodology are generated, and the components involved in the network traffic latency are reassigned to migrate the latency.

20 Claims, 8 Drawing Sheets

(51) Int. Cl.

| | | |
|---|---|---|
| *H04L 15/16* | (2006.01) | |
| *G06F 15/16* | (2006.01) | |
| *H04L 29/12* | (2006.01) | |
| *H04L 29/08* | (2006.01) | |
| *H04L 12/26* | (2006.01) | |
| *G06F 11/30* | (2006.01) | |
| *G06F 11/14* | (2006.01) | |
| *H04L 41/0823* | (2022.01) | |
| *H04L 41/08* | (2022.01) | |
| *H04L 43/08* | (2022.01) | |
| *H04L 41/12* | (2022.01) | |
| *H04L 61/5007* | (2022.01) | |

(52) U.S. Cl.
 CPC ............. *H04L 41/12* (2013.01); *H04L 43/08* (2013.01); *H04L 61/5007* (2022.05); *G06F 2009/45595* (2013.01)

(58) Field of Classification Search
 USPC .......................................................... 718/1
 See application file for complete search history.

(56) References Cited

U.S. PATENT DOCUMENTS

| | | | | |
|---|---|---|---|---|
| 9,164,795 | B1* | 10/2015 | Vincent | H04L 12/4633 |
| 9,241,170 | B1* | 1/2016 | Galligan | H04N 21/234327 |
| 9,282,033 | B2* | 3/2016 | Devireddy | H04L 45/745 |
| 9,515,930 | B2* | 12/2016 | Devireddy | H04L 69/22 |
| 9,588,788 | B1* | 3/2017 | Ramalingam | G06F 9/45558 |
| 9,756,121 | B2* | 9/2017 | Hwang | H04L 43/0817 |
| 9,986,031 | B2* | 5/2018 | Jain | H04L 67/1095 |
| 10,083,073 | B2* | 9/2018 | Ambichl | G06F 11/0748 |
| 10,348,767 | B1* | 7/2019 | Lee | H04L 63/0236 |
| 10,560,365 | B1* | 2/2020 | Losito | H04L 43/08 |
| 10,855,813 | B1* | 12/2020 | Moriarty | H04L 43/08 |
| 10,986,133 | B1* | 4/2021 | Lee | H04L 63/0236 |
| 11,038,766 | B2* | 6/2021 | Shen | H04L 41/12 |
| 11,139,958 | B2* | 10/2021 | Smith | G06F 16/951 |
| 11,223,514 | B2* | 1/2022 | Mayya | H04L 12/66 |
| 11,228,496 | B2* | 1/2022 | Fang | H04L 41/082 |
| 11,258,681 | B2* | 2/2022 | Bansal | H04L 43/026 |
| 2006/0026267 | A1* | 2/2006 | Godin | H04L 41/0843 709/220 |
| 2006/0064486 | A1* | 3/2006 | Baron | H04L 41/0886 709/224 |
| 2006/0209847 | A1* | 9/2006 | Binder | H04L 12/42 370/254 |
| 2007/0288921 | A1* | 12/2007 | King | G06F 9/45537 718/1 |
| 2008/0016115 | A1* | 1/2008 | Bahl | H04L 41/22 |
| 2009/0193122 | A1* | 7/2009 | Krishamurthy | H04L 43/0876 709/226 |
| 2010/0125902 | A1* | 5/2010 | Killian | H04L 63/0272 726/15 |
| 2010/0214940 | A1* | 8/2010 | Macauley | H04L 41/0806 370/252 |
| 2010/0312913 | A1* | 12/2010 | Wittenschlaeger | H04L 45/00 709/238 |
| 2011/0060816 | A1* | 3/2011 | Kumar | H04L 67/303 709/223 |
| 2011/0145056 | A1* | 6/2011 | Sullivan | G06Q 30/02 709/224 |
| 2012/0023258 | A1* | 1/2012 | Twitchell | H04L 69/22 709/232 |
| 2012/0042311 | A1* | 2/2012 | Biran | G06F 9/5077 718/1 |
| 2012/0047270 | A1* | 2/2012 | Chandrasekaran | H04L 41/12 709/227 |
| 2012/0102190 | A1* | 4/2012 | Durham | G06F 9/45558 718/1 |
| 2012/0151474 | A1* | 6/2012 | Biran | G06F 9/45558 718/1 |
| 2012/0278292 | A1* | 11/2012 | Zahavi | G06F 16/00 707/694 |
| 2012/0278804 | A1* | 11/2012 | Narayanasamy | H04L 65/1066 718/1 |
| 2013/0034015 | A1* | 2/2013 | Jaiswal | H04L 41/0843 370/254 |
| 2013/0091560 | A1* | 4/2013 | Killian | H04L 63/0272 726/12 |
| 2013/0262390 | A1* | 10/2013 | Kumarasamy | G06F 9/4856 707/649 |
| 2013/0290468 | A1* | 10/2013 | Ramakrishnan | G06F 9/4856 709/213 |
| 2013/0322263 | A1* | 12/2013 | Lang | H04L 43/04 370/244 |
| 2014/0052864 | A1* | 2/2014 | Van Der Linden | H04L 67/1097 709/226 |
| 2014/0297780 | A1* | 10/2014 | Zhou | H04L 67/5681 709/216 |
| 2015/0032888 | A1* | 1/2015 | Dinger | H04L 43/0876 709/224 |
| 2015/0033223 | A1* | 1/2015 | Chari | G06F 9/45558 718/1 |
| 2015/0058459 | A1* | 2/2015 | Amendjian | H04L 41/20 709/223 |
| 2015/0089499 | A1* | 3/2015 | Hsuan | G06F 9/45558 718/1 |
| 2015/0096011 | A1* | 4/2015 | Watt | G06F 3/0647 726/15 |
| 2015/0222656 | A1* | 8/2015 | Haugsnes | H04L 63/104 726/23 |
| 2015/0324215 | A1* | 11/2015 | Borthakur | G06F 9/45558 718/1 |
| 2015/0378762 | A1* | 12/2015 | Saladi | H04L 41/0895 718/1 |
| 2016/0080221 | A1* | 3/2016 | Ramachandran | H04L 43/0876 709/224 |
| 2016/0080230 | A1* | 3/2016 | Anand | G06F 16/285 709/224 |
| 2016/0094422 | A1* | 3/2016 | Poola | H04L 43/045 709/224 |
| 2016/0094477 | A1* | 3/2016 | Bai | G06F 9/5083 709/226 |
| 2016/0105376 | A1* | 4/2016 | Cvijetic | H04L 67/12 709/224 |
| 2016/0188377 | A1* | 6/2016 | Thimmappa | G06F 16/285 718/104 |
| 2016/0197803 | A1* | 7/2016 | Talbot | H04L 43/08 709/224 |
| 2016/0239328 | A1* | 8/2016 | Kaplan | G06F 9/45558 |
| 2016/0330277 | A1* | 11/2016 | Jain | H04L 67/1095 |
| 2016/0353345 | A1* | 12/2016 | Van der Merwe | H04L 12/4641 |
| 2016/0359913 | A1* | 12/2016 | Gupta | H04L 47/32 |
| 2016/0378614 | A1* | 12/2016 | Thanasekaran | G06F 11/1458 707/652 |
| 2016/0381030 | A1* | 12/2016 | Chillappa | H04W 4/38 726/11 |
| 2016/0381124 | A1* | 12/2016 | Hwang | H04L 43/0817 709/226 |
| 2017/0060628 | A1* | 3/2017 | Tarasuk-Levin | H04L 63/0209 |
| 2017/0109251 | A1* | 4/2017 | Das | G06F 9/45558 |
| 2017/0177222 | A1* | 6/2017 | Singh | H04L 67/1097 |
| 2017/0192826 | A1* | 7/2017 | Thimmappa | H04L 61/5007 |
| 2017/0374106 | A1* | 12/2017 | Hamou | H04L 41/0895 |
| 2018/0060117 | A1* | 3/2018 | Maskalik | G06F 9/4856 |
| 2018/0211322 | A1* | 7/2018 | Lintner | G06Q 40/02 |
| 2018/0284986 | A1* | 10/2018 | Bhagi | G06F 11/3034 |
| 2018/0285234 | A1* | 10/2018 | Degaonkar | G06F 11/0709 |
| 2018/0309637 | A1* | 10/2018 | Gill | H04L 43/067 |
| 2018/0314726 | A1* | 11/2018 | Bath | G06F 16/2255 |
| 2018/0332434 | A1* | 11/2018 | Kulkarni | H04L 43/10 |
| 2018/0351806 | A1* | 12/2018 | Mohanram | H04L 41/0873 |
| 2019/0081899 | A1* | 3/2019 | Mundkur | H04L 47/34 |
| 2019/0319868 | A1* | 10/2019 | Svennebring | H04L 41/147 |
| 2019/0342219 | A1* | 11/2019 | Liu | H04L 43/20 |
| 2020/0092299 | A1* | 3/2020 | Srinivasan | H04L 63/1425 |

(56) References Cited

U.S. PATENT DOCUMENTS

| | | | |
|---|---|---|---|
| 2020/0112485 A1* | 4/2020 | Shen | H04L 41/12 |
| 2020/0159961 A1* | 5/2020 | Smith | G06F 16/951 |
| 2020/0278915 A1* | 9/2020 | Degaonkar | H04L 41/069 |
| 2020/0334125 A1* | 10/2020 | Degaonkar | G06F 11/3058 |
| 2021/0006642 A1* | 1/2021 | He | H04L 43/0817 |
| 2021/0173688 A1* | 6/2021 | Singhal | G06K 9/6247 |
| 2021/0191746 A1* | 6/2021 | Vaikar | H04L 41/0886 |
| 2021/0397473 A1* | 12/2021 | Xiang | H04L 69/40 |
| 2022/0006755 A1* | 1/2022 | Busick | H04L 41/0806 |

FOREIGN PATENT DOCUMENTS

| | | | | |
|---|---|---|---|---|
| CN | 110297867 B | * | 8/2021 | G06F 16/27 |
| EP | 2555106 A2 | * | 2/2013 | G06F 21/79 |
| WO | WO-2019006696 A1 | * | 1/2019 | G06F 9/455 |
| WO | WO-2019094729 A1 | * | 5/2019 | G06N 3/0436 |
| WO | WO-2021163706 A1 | * | 8/2021 | G16B 20/20 |

\* cited by examiner

SYSTEM AND METHOD FOR OPTIMIZING NETWORK TOPOLOGY IN A VIRTUAL COMPUTING ENVIRONMENT

RELATED APPLICATIONS

Benefit is claimed under 35 U.S.C. 119(a)(d) to Foreign Application Serial No. 201941052602 filed in India entitled "SYSTEM AND METHOD FOR OPTIMIZING NETWORK TOPOLOGY IN A VIRTUAL COMPUTING ENVIRONMENT" on Dec. 18, 2019, by VMWARE, Inc., which is herein incorporated in its entirety by reference for all purposes.

BACKGROUND ART

Among the key factors that affect computer network performance, Network Latency is an important measure. Network latency is the time needed to send a packet from a source to a destination and this time can be influenced by several attributed like the number of hops/devices in the path or the actual physical distance of the medium to be traversed by the packet or the performance of each device in the path.

A well-designed network topology, with due regard to workload placement, can ensure that the latency remains within acceptable limits. But data centers and thus the networks evolve over time with new applications, computer, storage and networking components getting added to the existing topology. Introduce compute and network virtualization into the mix, and one could end up with network topologies that have increased latency owing to bad placement of the workload in relation to the virtual/physical network.

End-users of the applications are usually the first ones to spot the slowness in the applications and would report it to the applications administrator who in turn would investigate and report it to the network administrator. The network administrator then has to rely on traditional tools like ping, traceroute, wireshark, solarwinds, syslog, actual device configuration, etc., to investigate and fix the issue, which as we know is a complex and time-consuming task, more so when bad topology (e.g., 3 hops in the path when 1 would have been possible and sufficient) is the root cause of the issue. The troubleshooting problems can get even more aggravated when the people/teams handling the network administration and virtual infrastructure administration are different/siloed and have different skill set and have no visibility into the others domain.

Further, in the current environment, alerts/notification etc., are generated by network/device management software when any change or problem is spotted in any networking device. But these alerts are point alerts, a route xyz on device pqr has been deleted for instance. What they lack is the big picture impact of these changes/problems. So even after the topology problem is corrected, there is no way to ensure that the topology remains unchanged or at the very least, administrators are alerted if there are some changes that are adversely affecting the network topology.

It should also be noted that most computing environments, including virtual network environments are not static. That is, various machines or components are constantly being added to, or removed from, the computer environment. As such changes are made to the computing environment, it is frequently necessary to amend or change which of the various machines or components (virtual and/or physical) are registered with the security system. And even in a perfectly laid out network environment the introduction of components and machines is bound to introduce segmentations and hairpins which affect the performance of the network. These performance problems are more exacerbated in the virtual computing environment with heavy network traffic between them.

FIG. 1B illustrates a conventional virtual networking communication between two virtual machines. In the example shown in FIG. 1B, the VMs 171, 172 with heavy network traffic between them are placed in different virtual local area networks (VLANs). In this topology, packets have to take two additional hops as compared to a topology where the VMs 171, 172 were on the same VLAN. The term hairpin refers to a network topology where the two communicating VMs are on the same host but the packets get routed on a virtual routing and forward (VRF) that is on a physical router 180 owing to which the packet leaves the hosts and then re-enter it, thus causing a hairpin like topology. This hop of packet from and to the host via the Top of Rack (TOR) and physical router(s) 180 adversely impacts the latency of the flow. Additionally, such major hairpins ("Elephant hairpins") can starve smaller flows ("mouse flows") traversing the routers thus causing a problem not only for themselves, but for other too. Such a hairpin topology typically looks as shown in FIG. 1B. Hairpins are very common in most conventional virtual networking environments since the routing that has to be performed on a physical router 180 connected to the hosts or to the TORs. Thus, conventional approaches for providing security to machines or components of a computing environment, including a machine learning environment, are highly dependent upon the skill and knowledge of a system administrator. Also, conventional approaches for providing security to machines or components of a computing environment, are not acceptable in complex and frequently revised computing environments.

In conventional approaches to discovery and monitoring of services and applications in a computing environment, constant and difficult upgrading of agents is often required. Thus, conventional approaches for application and service discovery and monitoring are not acceptable in complex and frequently revised computing environments.

Additionally, many conventional networking systems require every machine or component within a computing environment be assigned to a particular scope and service group so that the intended states can be derived from the service type. As the size and complexity of computing environments increases, such a requirement may require a high-level system administrator to manually register as many as thousands (or many more) of the machines or components (such as, for example, virtual machines) with the security system. Thus, such conventionally mandated registration of the machines or components is not a trivial job. This burden of manual registration is made even more burdensome considering that the target users of many security systems are often experienced or very high-level personnel such as, for example, Chief Information Security Officers (CISOs) and their teams who already have heavy demands on their time.

Furthermore, even such high-level personnel may not have full knowledge of the network topology of the computing environment or understanding of the functionality of every machine or component within the computing environment. Hence, even when possible, the time and/or person-hours necessary to perform and complete such a conventionally required configuration for a security system can extend to days, weeks, months or even longer.

Moreover, even when such conventionally required manual registration of the various machines or components is completed, it is not uncommon that entities, including the aforementioned very high level personnel, have failed to properly assign the proper scopes and services to the various machines or components of the computing environment. Furthermore, in conventional networking systems, it not uncommon to find such improper assignment of scopes and services to the various machines or components of the computing environment even after a conventional security system has been operational for years since its initial deployment. As a result, such improper assignment of the scopes and services to the various machines or components of the computing environment may have significantly and deleteriously impacted the network traffic performance of conventional networking systems even for a prolonged duration.

Furthermore, as stated above, most computing environments, including machine learning environments are not static. That is, various machines or components are constantly being added to, or removed from, the computing environment. As such changes are made to the computing environment, it is necessary to review the changed computing environment and once again assign the proper scopes and services to the various machines or components of the newly changed computing environment. Hence, the aforementioned overhead associated with the assignment of scopes and services to the various machines or components of the computing environment will not only occur at the initial phase when deploying a conventional networking system, but such aforementioned overhead may also occur each time the computing environment is expanded, updated, or otherwise altered. This includes instances in which the computing environment is altered, for example, by is expanding, updating, or otherwise altering, for example, the roles of machine or components including, but not limited to, virtual machines of the computing environment.

BRIEF DESCRIPTION OF THE DRAWINGS

The accompanying drawings, which are incorporated in and form a part of this specification, illustrate embodiments of the present technology and, together with the description, serve to explain the principles of the present technology.

Figure 1A:
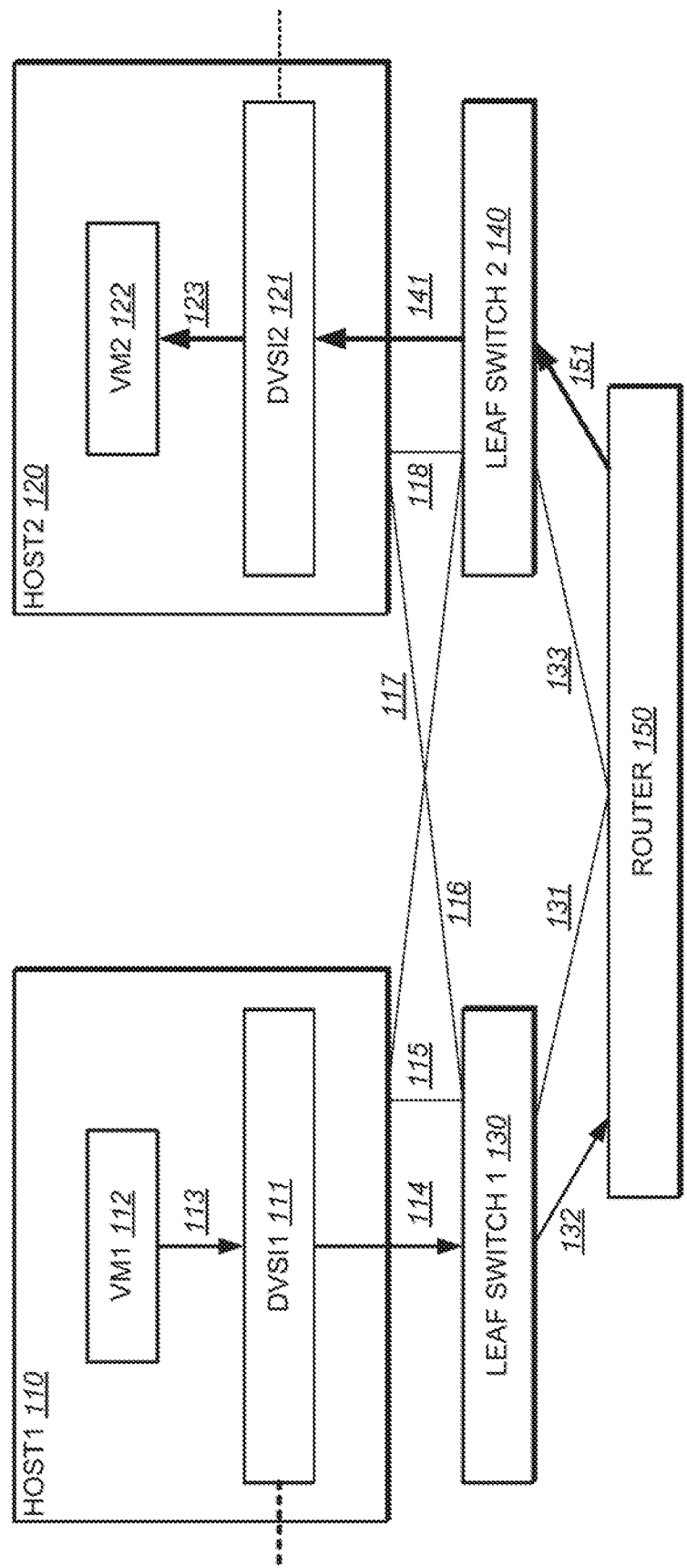
FIG. 1A shows an example of a frequently communicating virtual machines coupled to different virtual local area networks.

The drawings referred to in this description should not be understood as being drawn to scale except if specifically noted.

DETAILED DESCRIPTION OF EMBODIMENTS

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying", "identifying", "generating", "deriving", "providing," "utilizing", "determining," or the like, refer to the actions and processes of an electronic computing device or system such as: a host processor, a processor, a memory, a virtual storage area network (VSAN), virtual local area networks (VLANS), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some embodiments, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Figure 2:
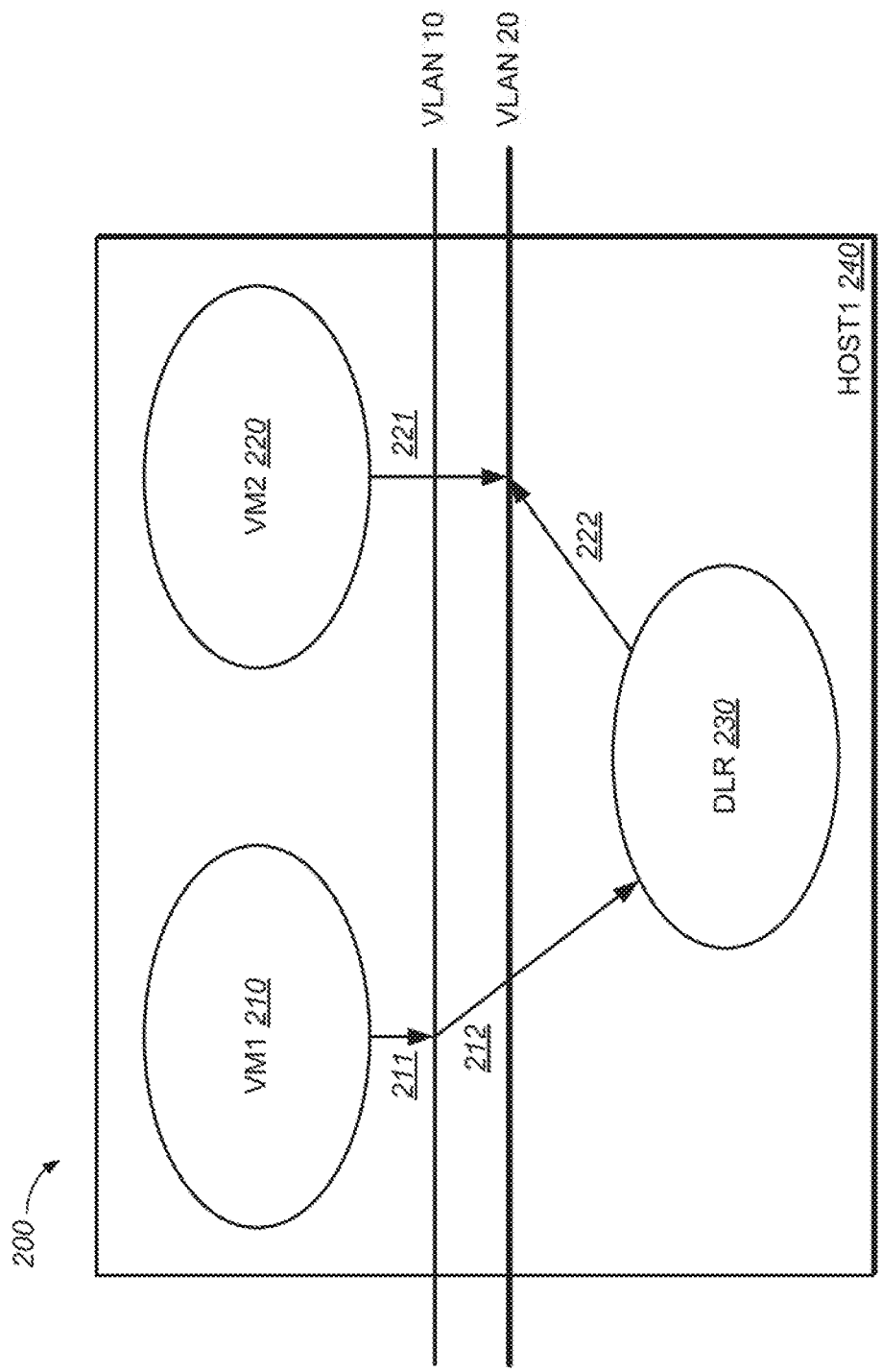
FIG. 2 shows an example of two virtual machines involved in a hairpin in accordance with an embodiment of the present invention.

FIG. 2 illustrates an embodiment of a virtual networking communication between two virtual machines. In the example shown in FIG. 2, the VMs 210, 220 with heavy network traffic between them are placed in different virtual local area networks (VLANs). In this topology, packets have to take two additional hops as compared to a topology where the VMs 210, 220 were on the same VLAN. The term hairpin refers to a network topology where the two communicating VMs 210, 220 are on the same host but the packets get routed on a virtual routing and forward (VRF) that is on a physical router owing to which the packet leaves the hosts and then re-enter it, thus causing a hairpin like topology. The example illustrated in FIG. 2 resolves the hairpin problems of the conventional network topology configuration by routing communications through a logical distributed virtual router (DLR) 230.

Example Computer System Environment

Figure 1B:
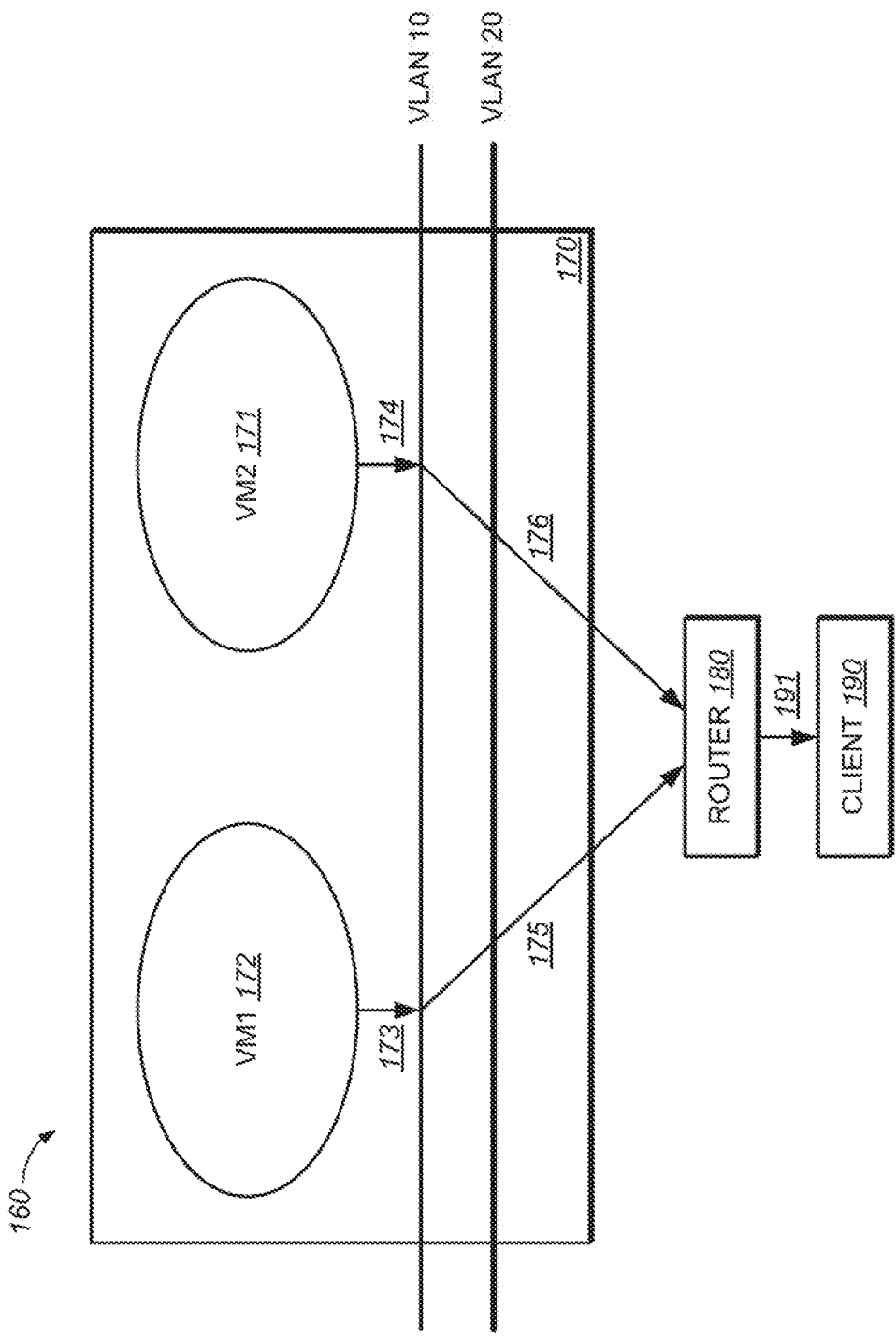
FIG. 1 B shows an example of two virtual machines involved in a conventional hairpin.
Figure 3:
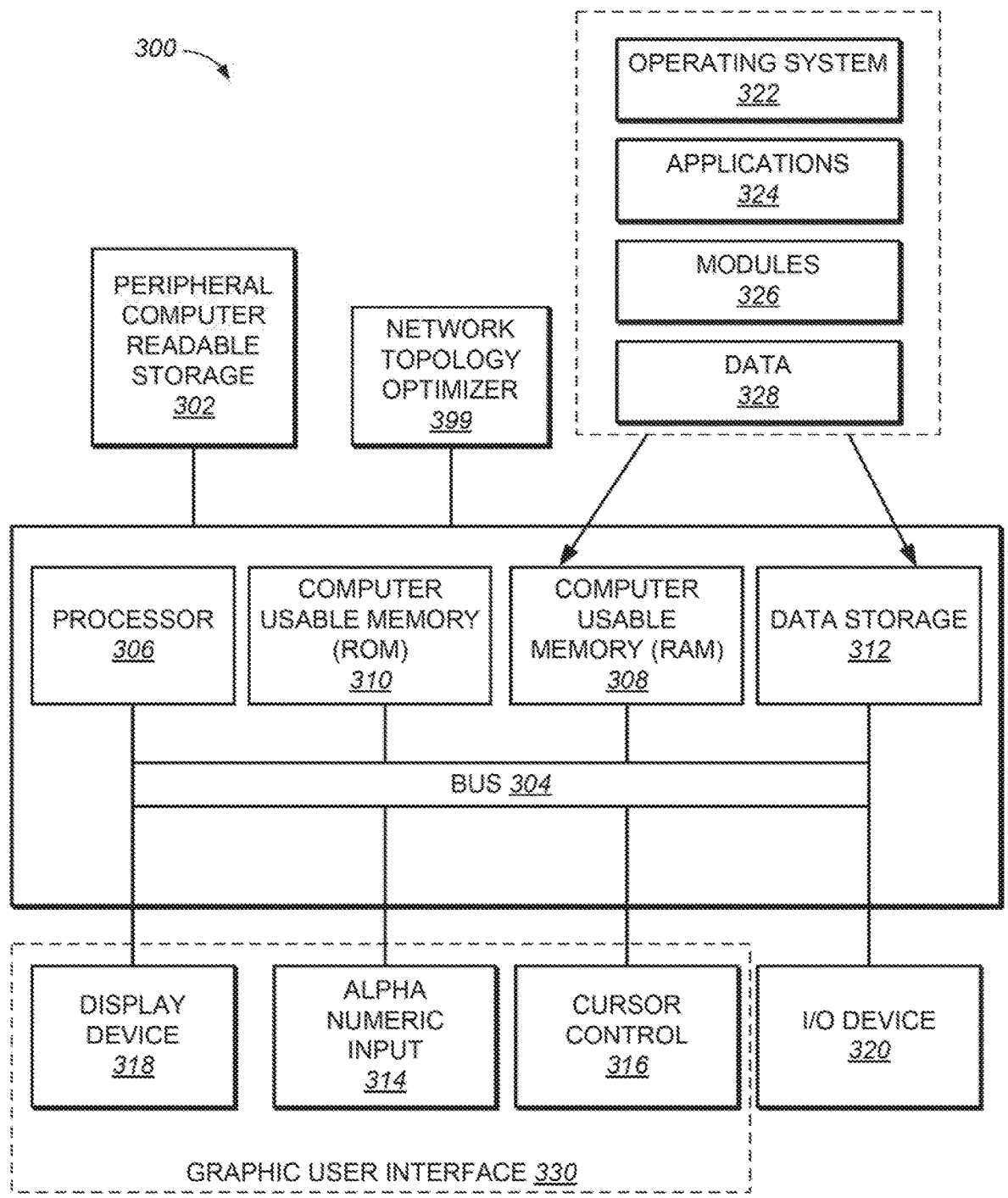
FIG. 3 shows an example computer system upon which embodiments of the present invention can be implemented, in accordance with an embodiment of the present invention.

With reference now to FIG. 3, all or portions of some embodiments described herein are composed of computer-readable and computer-executable instructions that reside, for example, in computer-usable/computer-readable storage media of a computer system. That is, FIG. 3 illustrates one example of a type of computer (computer system 300) that can be used in accordance with or to implement various embodiments which are discussed herein. It is appreciated that computer system 300 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, standalone computer systems, media centers, hand-held computer systems, multi-media devices, virtual machines, virtualization management servers, and the like. Computer system 300 of FIG. 3 is well adapted to having peripheral tangible computer-readable storage media 302 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 300 of FIG. 3 includes an address/data bus 304 for communicating information, and a plurality of processors 306 coupled with bus 304 for processing information and instructions. As depicted in FIG. 3, system 300 is also well suited to a multi-processor environment in which a plurality of processors 306 are present. Conversely, system 300 is also well suited to having a single processor such as, for example, processor 306. Processors 306 may be any of various types of microprocessors. System 300 also includes data storage features such as a computer usable volatile memory 308, e.g., random access memory (RAM), coupled with bus 304 for storing information and instructions for processors 306.

System 300 also includes computer usable non-volatile memory 310, e.g., read only memory (ROM), coupled with bus 304 for storing static information and instructions for processors 306. Also present in system 100 is a data storage unit 312 (e.g., a magnetic or optical disc and disc drive) coupled with bus 304 for storing information and instructions. System 300 also includes an alphanumeric input device 314 including alphanumeric and function keys coupled with bus 304 for communicating information and command selections to one or more of processors 306. System 300 also includes a cursor control device 316 coupled with bus 304 for communicating user input information and command selections to one or more of processors 306. In one embodiment, system 300 also includes a display device 318 coupled with bus 304 for displaying information.

Referring still to FIG. 3, display device 318 of FIG. 3 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 316 allows the computer user to dynamically signal the movement of a visible symbol (cursor) on a display screen of display device 318 and indicate user selections of selectable items displayed on display device 318. Many implementations of cursor control device 316 are known in the art including a trackball, mouse, touch pad, touch screen, joystick or special keys on alphanumeric input device 314 capable of signaling movement of a given direction or manner of displacement. Alternatively, it will be appreciated that a cursor can be directed and/or activated via input from alphanumeric input device 314 using special keys and key sequence commands. System 300 is also well suited to having a cursor directed by other means such as, for example, voice commands. In various embodiments, alpha-numeric input device 314, cursor control device 316, and display device 318, or any combination thereof (e.g., user interface selection devices), may collectively operate to provide a graphical user interface (GUI) 330 under the direction of a processor (e.g., processors 306). GUI 330 allows user to interact with system 300 through graphical representations presented on display device 318 by interacting with alpha-numeric input device 314 and/or cursor control device 316.

System 300 also includes an I/O device 320 for coupling system 300 with external entities. For example, in one embodiment, I/O device 320 is a modem for enabling wired or wireless communications between system 300 and an external network such as, but not limited to, the Internet.

Referring still to FIG. 3, various other components are depicted for system 300. Specifically, when present, an operating system 322, applications 324, modules 326, and data 328 are shown as typically residing in one or some combination of computer usable volatile memory 308 (e.g., RAM), computer usable non-volatile memory 310 (e.g., ROM), and data storage unit 312. In some embodiments, all or portions of various embodiments described herein are stored, for example, as an application 324 and/or module 326 in memory locations within RAM 308, computer-readable storage media within data storage unit 312, peripheral computer-readable storage media 302, and/or other tangible computer-readable storage media.

Brief Overview

First, a brief overview of an embodiment of the present Network Optimization invention, is provided below. Various embodiments of the present invention provide a method and system for automated network topology optimization within a virtual machine computing network environment.

More specifically, the various embodiments of the present invention provide a novel approach for automatically providing identifying communication patterns between virtual machines (VMs) coupled to different virtual local area networks (VLANs) in a virtual computing network environment to identify hairpins in the communications between VMs pairs in order to optimize network traffic by migrating said communicating VMs generating the hairpins to improve network traffic in the computing environment. In one embodiment, an IT administrator (or other entity such as, but not limited to, a user/company/organization etc.) registers multiple number of machines or components, such as, for example, virtual machines onto a network system platform, such as, for example, virtual networking products from VMware, Inc. of Palo Alto.

In the present embodiment, the IT administrator is not required to label all of the virtual machines with the corresponding service type or indicate the importance of the particular machine or component. Further, the IT administrator is not required to manually list only those machines or components which the IT administrator feels warrant protection from excessive network traffic utilization. Instead, and as will be described below in detail, in various embodiments, the present invention, will automatically determine which machines or component are to be protected by the network optimization system.

As will also be described below, in various embodiments, the present invention is a computing module which is integrated within a network traffic monitoring and optimization system. In various embodiments, the present network traffic and optimization invention, will itself identify network traffic between communicating virtual machines and determine whether the communication is excessive thereby creating network latency after observing the activity by each of the machines or components for a period of time in the computing environment.

Additionally, for purposes of brevity and clarity, the present application will refer to "machines or components" of a computing environment. It should be noted that for purposes of the present application, the terms "machines or components" is intended to encompass physical (e.g., hardware and software based) computing machines, physical components (such as, for example, physical modules or portions of physical computing machines) which comprise such physical computing machines, aggregations or combination of various physical computing machines, aggregations or combinations or various physical components and the like. Further, it should be noted that for purposes of the present application, the terms "machines or components" is also intended to encompass virtualized (e.g., virtual and software based) computing machines, virtual components (such as, for example, virtual modules or portions of virtual computing machines) which comprise such virtual computing machines, aggregations or combination of various virtual computing machines, aggregations or combinations or various virtual components and the like.

Additionally, for purposes of brevity and clarity, the present application will refer to machines or components of a computing environment. It should be noted that for purposes of the present application, the term "computing environment" is intended to encompass any computing environment (e.g., a plurality of coupled computing machines or components including, but not limited to, a networked plurality of computing devices, a neural network, a machine learning environment, and the like). Further, in the present application, the computing environment may be comprised of only physical computing machines, only virtualized computing machines, or, more likely, some combination of physical and virtualized computing machines.

Furthermore, again for purposes and brevity and clarity, the following description of the various embodiments of the present invention, will be described as integrated within a computer network system. Importantly, although the description and examples herein refer to embodiments of the present invention integrated within a computer network system with, for example, its corresponding set of functions, it should be understood that the embodiments of the present invention are well suited to not being integrated into a computer network system and operating separately from a computer network system. Specifically, embodiments of the present invention can be integrated into a system other than a computer network system.

Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Importantly, the embodiments of the present network traffic optimization invention significantly extend what was previously possible with respect to providing network monitoring tools for machines or components of a computing environment. Various embodiments of the present network topology optimization invention enable the improved capabilities while reducing reliance upon, for example, an IT administrator, to manually monitor and register various machines or components of a computing environment for network traffic tracking. This is in contrast to conventional approaches for providing network traffic tools to various machines or components of a computing environment which highly dependent upon the skill and knowledge of a system administrator. Thus, embodiments of present network topology optimization invention provide a methodology which extends well beyond what was previously known.

Also, although certain components are depicted in, for example, embodiments of the network topology optimization invention, it should be understood that, for purposes of clarity and brevity, each of the components may themselves be comprised of numerous modules or macros which are not shown.

Procedures of the present network topology optimization invention are performed in conjunction with various computer software and/or hardware components. It is appreciated that in some embodiments, the procedures may be performed in a different order than described above, and that some of the described procedures may not be performed, and/or that one or more additional procedures to those described may be performed. Further some procedures, in various embodiments, are carried out by one or more processors under the control of computer-readable and computer-executable instructions that are stored on non-transitory computer-readable storage media. It is further appreciated that one or more procedures of the present may be implemented in hardware, or a combination of hardware with firmware and/or software.

Hence, the embodiments of the present network topology optimization invention greatly extend beyond conventional methods for providing network security to machines or components of a computing environment. Moreover, embodiments of the present invention amount to significantly more than merely using a computer to provide conventional network monitoring measures to machines or components of a computing environment. Instead, embodiments of the present invention specifically recite a novel process, necessarily rooted in computer technology, for improving network communication within a virtual computing environment.

Additionally, as will be described in detail below, embodiments of the present invention provide a network monitoring and optimization system including a novel search feature for machines or components (including, but not limited to, virtual machines) of the computing environment. The novel search feature of the present network optimization system enables ends users to readily assign the proper and scopes and services the machines or components of the computing environment. Moreover, the novel search feature of the present network optimization system enables end users to identify various machines or components (including, but not limited to, virtual machines) similar to given and/or previously identified machines or components (including, but not limited to, virtual machines) when such machines or component satisfy a particular given criteria and are moved within the computing environment. Hence, as will be described in detail below, in embodiments of the present security system, the novel search feature functions by finding or identifying the "siblings" of various other machines or components (including, but not limited to, virtual machines) within the computing environment.

Continued Detailed Description of Embodiments after Brief Overview

As stated above, feature selection which is also known as "variable selection", "attribute selection" and the like, is an import process of machine learning. The process of feature selection helps to determine which features are most relevant or important to use to create a machine learning model (predictive model).

In embodiments of the present invention, a network topology optimization system such as, for example, provided in virtual machines from VMware, Inc. of Palo Alto, Calif. will utilize a network traffic identification method to automatically identify excessive communication between computing components and take remediation steps to improve traffic latency in the computing environment. That is, as will be described in detail below, in embodiments of the present network topology optimization invention, a computing module, such as, for example, the network topology optimization module 399 of FIG. 3, is coupled with a computing environment.

Additionally, it should be understood that in embodiments of the present network topology optimization invention network topology optimization module 399 of FIG. 3 may be integrated with one or more of the various components of FIG. 3. Network topology Optimization module 399 then automatically evaluates the various machines or components of the computing environment to determine the importance of various features within the computing environment.

Several selection methodologies are currently utilized in the art of feature selection. The common selection algorithms include three classes: Filter Methods, Wrapper Methods and Embedded Methods. In Filter Methods, scores are assigned to each feature based on a statistical measurement. The features are then ranked by their scores and are either selected to be kept as relevant features or they are deemed to not be relevant features and are removed from or not included in dataset of those features defined as relevant features. One of the most popular algorithms of the Filter Methods classification is the Chi Squared Test. Algorithms in the Wrapper Methods classification consider the selection of a set of features as a search result from the best combinations. One such example from the Wrapper Methods classification is called the "recursive feature elimination" algorithm. Finally, algorithms in the Embedded Methods classification learn features while the machine learning model is being created, instead of prior to the building of the model. Examples of Embedded Method algorithms include the "LASSO" algorithm and the "Elastic Net" algorithm.

Embodiments of the present Network topology Optimization invention utilize a statistic model to determine the importance of a particular feature within, for example, a machine learning environment.

Figure 4:
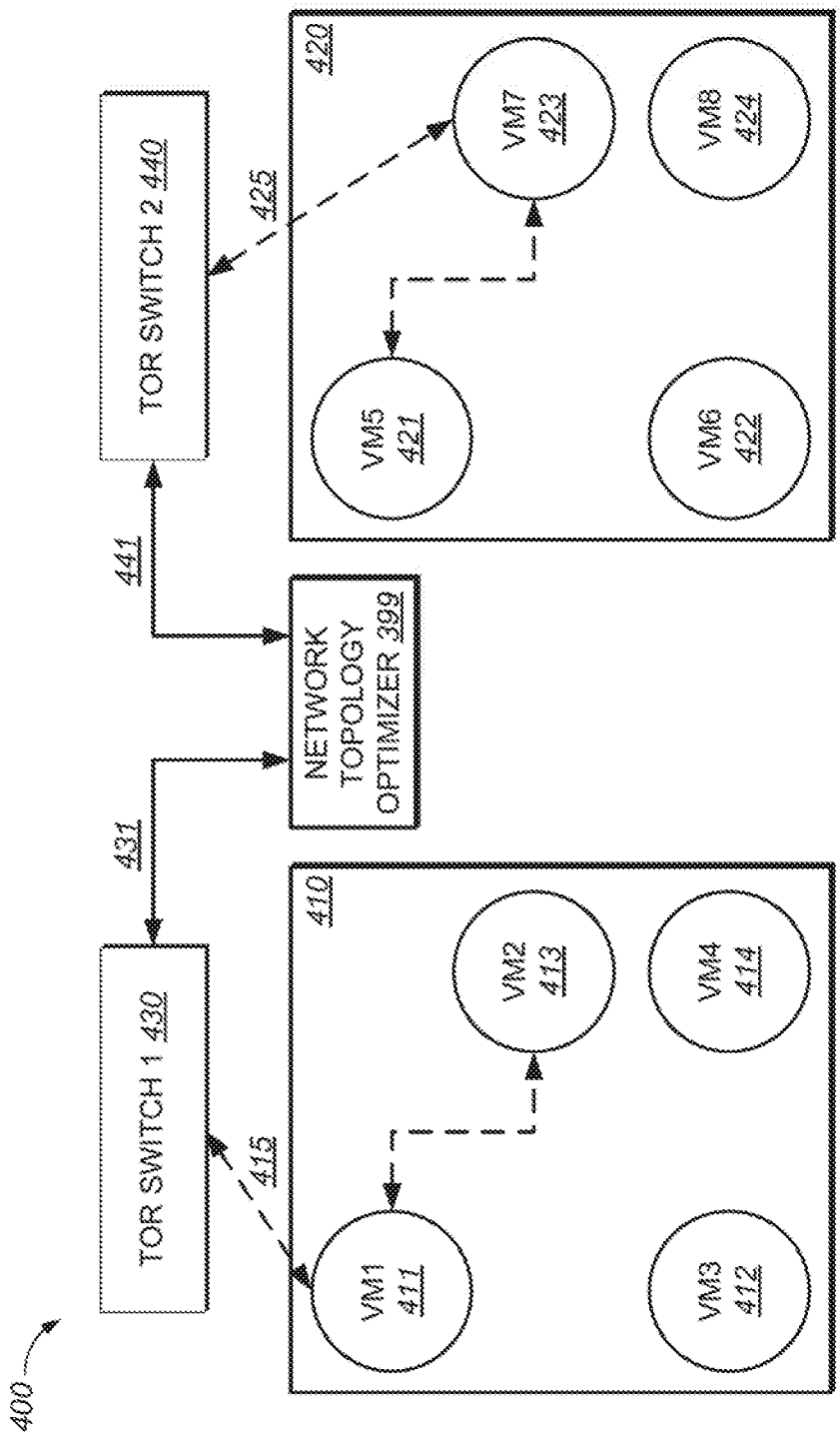
FIG. 4 is a block diagram of an exemplary virtual computing network environment, in accordance with an embodiment of the present invention.

With reference now to FIG. 4, a block diagram of an exemplary virtual network system 400, in accordance with one embodiment of the present invention.

Servers usually include a local network that can be configured to support traffic/flows associated with one or more virtual LANs (VLAN). VLANs are typically employed to segregate traffic from different entities in order to improve performance. However, the number of VLANs are currently limited and as traffic volume of traffic increases, it is necessary to upgrade the network's capacity to process the increased traffic. Hence, to improve network performance to support larger volumes of traffic network virtualization has been proposed as a methodology to use. Network virtualization methods can extend the capacity of a network to support many "virtual networks", and each virtual network can be utilized to support traffic associated with one or more entities.

Still referring to FIG. 4, data center 400 comprises two rack servers 410 and 420. It should be appreciated that a data center can include hundreds of rack servers connected to each other. However, for the purpose of explaining the computing environment of the present invention, the description will make use of only two rack servers 410 and 420. Each rack server 410 and 420 can be configured to support some number of virtual machines (VMs) as illustrated by VM1 to VM8 411, 412, 413, 414, 421, 422, 423, 424 in the figure.

In a data center like that illustrated in FIG. 4, each of the rack servers 410 and 420 may run in different Layer 2 segments and in such cases VM1-VM8 411, 412, 413, 414, 421, 422, 423, 424 cannot communicate with other VMs running in other Layer 2 segments unless there is VLAN, which will allow the VMs transfer data packets to other Layer 2 segments. Such transfer of data packets to over the VLAN raises the potential of network latency when VMs are heavily and frequently communicating over different VLANs leading to the generation of hairpins.

This is further illustrated in the figure, which is shown to include one or more switches, such as the Network topology Optimizer 399, linked to two top-of-rack (TOR) switches 430 and 440, each of which is in turn linked to servers 410 and 420. The switches 430, 440 generally operate to receive data packets from a neighboring device and forwards the data packets to their destination, whether the destination is a server or a switch. For example, when VM 1, 411 is running on server 410 is in frequent communication with VM 6, 422 and generates a data packet for transmission to VM6, 422 running on server 420, then the connection is setup via TOR switch 1430 the Network topology optimizer 399 and the TOR switch 2 440. By communicating via Network topology Optimizer 399, any hairpins that would have been generated in the VM1 to VM6 411, 412, 413, 414, 421, 422, 423, 424 communication will be identified and mitigated. In one embodiment, the mitigation will involve migrating VM1, 411 and VM6, 422 to the same VLAN.

Figure 5:
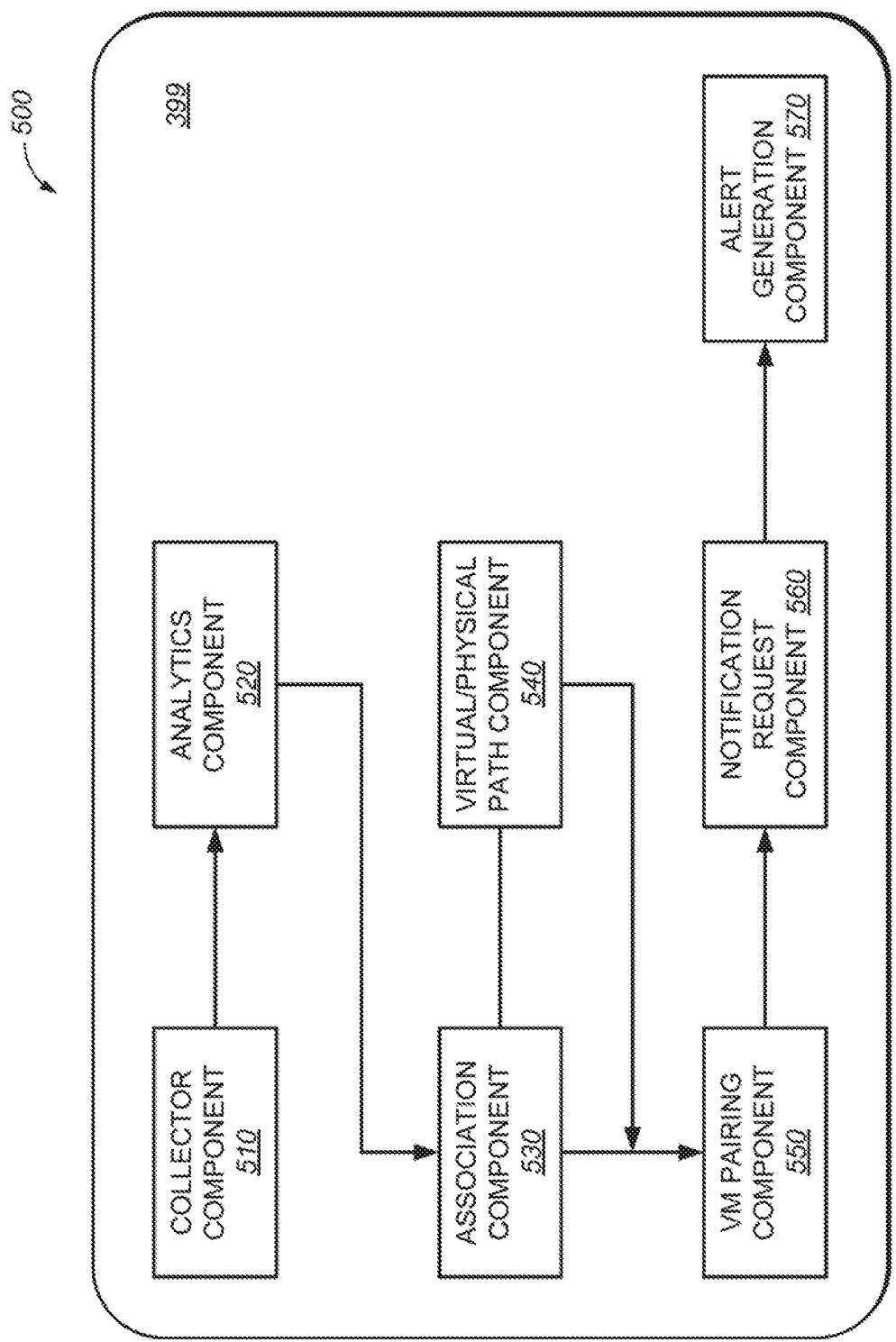
FIG. 5 is a block diagram of an example of an embodiment of the network topology optimizer, in accordance with an embodiment of the present invention.

With reference now to FIG. 5, a block diagram of an exemplary components of one embodiment of the network topology optimizer 399 in accordance to an embodiment of the present invention is illustrated. As shown in FIG. 5, the network topology optimizer 399 comprises collection component 510, analytics component 520, data association component 530, virtual/physical communication path component 540, VM pairing component 550, notification requests component 560 and alert generation component 570.

In one embodiment, the collection component 510 provides a mechanism for communicating with applications, such as the virtual data center (vCenter), host manager, physical switches, routers, firewalls in the network environment to collect configuration and flow information between communicating components in the computing environment. The information collected by collection component 510 is presented to the analytics component 520.

In one embodiment, the analytics component 520 takes the information provided by the collection component 510 and stores the information for processing. In one embodiment, the analytics component 520 analyzes, correlates and enriches the information received from the collection component 510. For example, if the flow information received by the analytics component 520 has only the internet protocol (IP) address of a virtual machine, the analytics component 520 will enrich the flow information by associating the IP address with the virtual network interface cards (vNiCs) of the VMs. Alternatively, the VM information may be enriched by correlating it with the physical router and port that is serving as the default gateway for the VM. The analytics component 520 also generates an intermediate data structure like graph to represent the Layer 3 networking components of a device neighborhood graph.

Referring still to FIG. 5, in one embodiment, the enriched information generated by the analytics component 520 is presented to the data association component 530. In one embodiment, the data association component 530 uses information computed from the virtual and physical path (both Layer 2 and Layer 3) between two VMs generated by the virtual/physical path component 540 and associates the flow information with the deduced path topology.

The virtual/physical path component 540 generates topology information identifying the hairpins present in the computing environment. The hairpin information is utilized by the VM pairing component 550 to generate a list of VM pairs that are causing hairpinned traffic with recommendation of device level rings (DLRs) and its routes for resolving the hairpins. In one embodiment, the VM pairing components 550 generates a structured file that may be imported to the host server to create a list of DLRs and routes which enables the network administrator to automatically migrate VMs easily.

Referring still to FIG. 5, the notification request component 560 alerts a user the presence of hairpins between a communicating VM pair and alerts the user on changes in the topology of these pair. The alert requests by notification request component 560 are presented to alert component 570 for processing. In one embodiment the alert generation component 570 receives new configuration information pulled by the collection component 510 and alerts when changes in VMs of interest being monitored during to the excessive communication traffic.

Figure 6A:
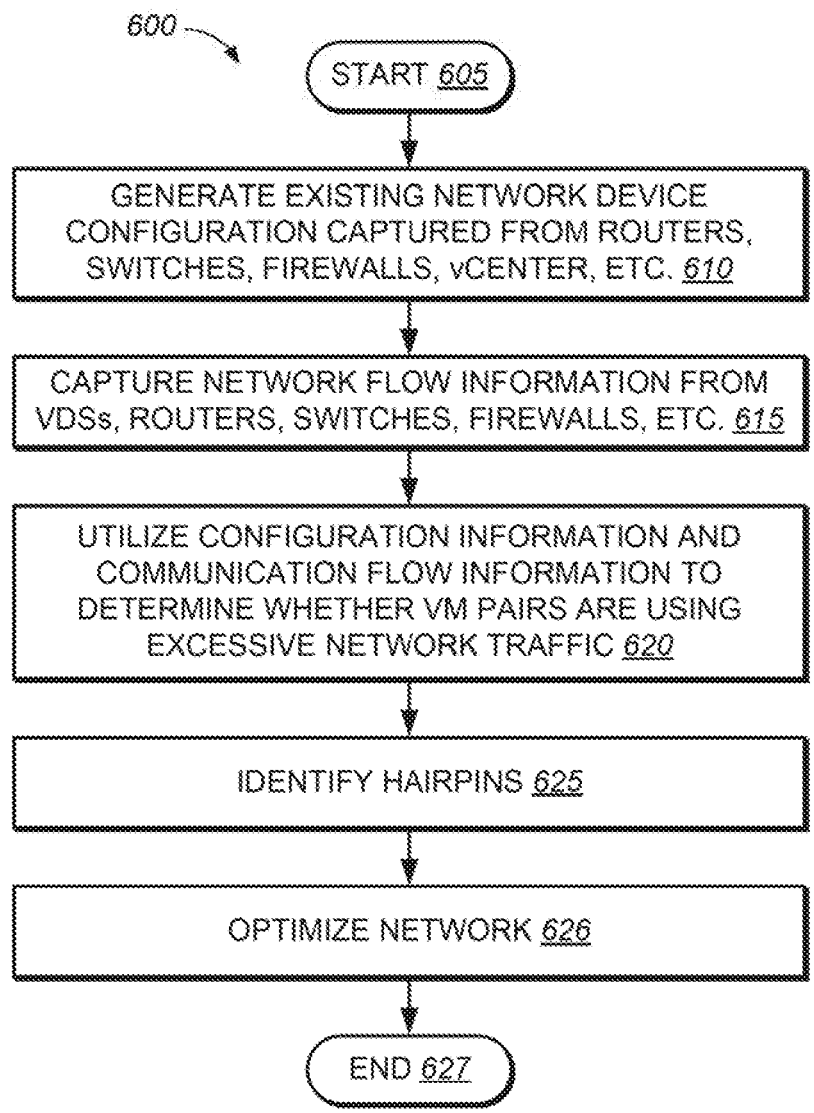
FIG. 6A is a flow diagram of an exemplary method for hairpin identification for a virtual computing network environment, in accordance with an embodiment of the present invention.

Referring now to flow chart 600 of FIG. 6A, as shown at 610 embodiments of the present Network Topology Optimizer 399 invention automatically determines the presence of hairpin in a virtual computing environment by generating a list of existing network device configuration information captured from network components, such as routers, firewalls, switches, vCenter, etc., within the computing environment.

Referring next to 615, in some embodiments of the present Network Topology Optimizer 399 invention, the results from 610 of FIG. 6A are then used to capture network flow information from network components in the computing environment, such as a virtual dedicate server (VDSs), routers, switches, firewalls, etc.

At Step 620, the information gathered in steps 610 and 615 are then utilized to determine the communication traffic between VMs in the computing environment. At step 625, the monitoring of network traffic in the computing environment enables the Network Optimizer 399 to determine communication component pairs generating hairpin traffic in the computing environment.

At Step 626, the Network Topology Optimizer 399 generates a list of VM pairs with a hairpin communication path and migrates those VM pairs on different VLANs to the same VLANs in order to reduce the hairpin traffic and to readjust the network topology of the computing environment.

Once again, although various embodiments of the present Network Optimizer invention described herein refer to embodiments of the present invention integrated within a security system with, for example, its corresponding set of functions, it should be understood that the embodiments of the present invention are well suited to not being integrated into a security system and operating separately from a security system. Specifically, embodiments of the present invention can be integrated into a system other than a security system. Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Figure 6B:
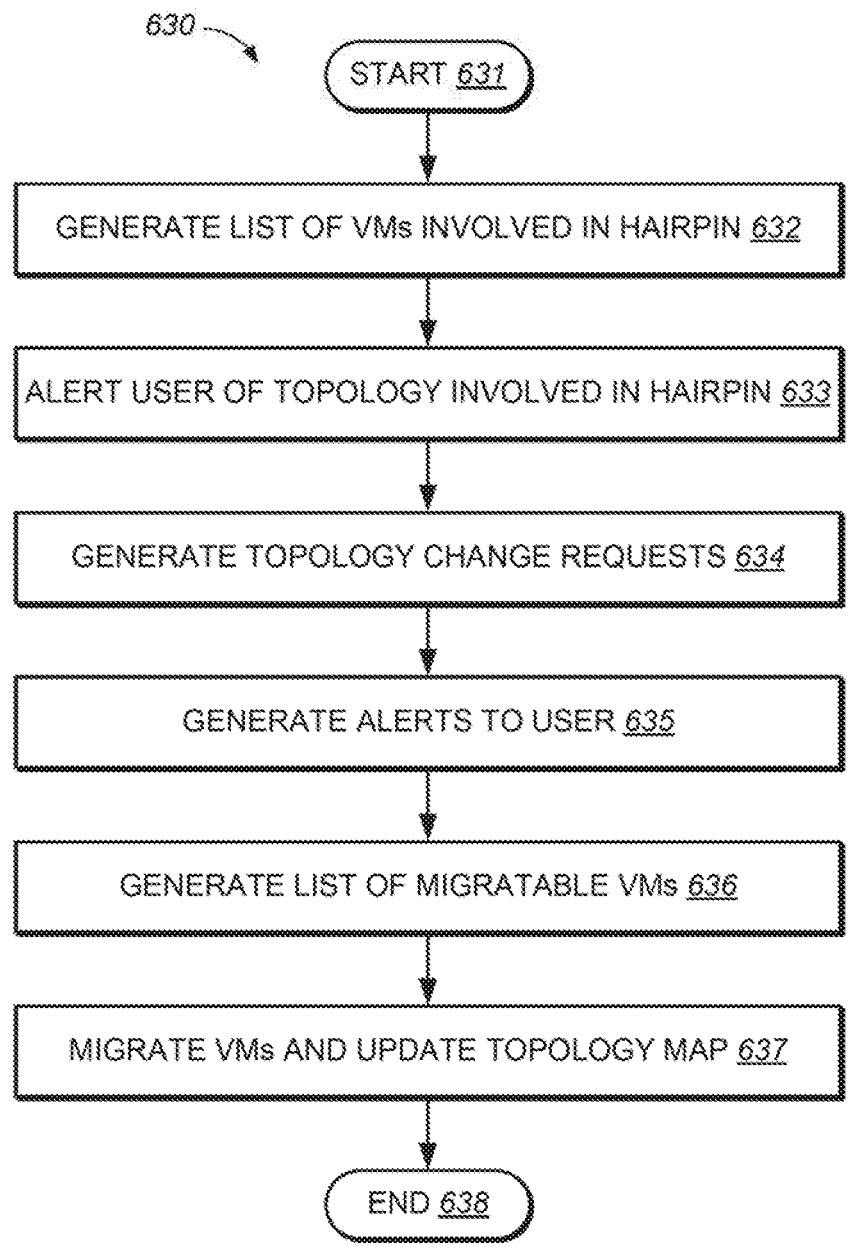
FIG. 6B is a flow diagram of an exemplary method for optimizing network topology in a virtual computing network environment in accordance with an embodiment of the present invention.

With reference next to FIG. 6B, a workflow diagram 630 of an exemplary embodiment of the network optimization is provided. As shown in FIG. 6B, the network topology optimizer 399 generates a list of VMs involved in hairpin traffic after the hairpin identification component 625 in FIG. 6A. In one embodiment, the following identification algorithm is used to generate the list of hairpinned VMs:

```
Initialize empty set to collect Pair of VMs involved in hairpin, say result
For each flow in vRNI, say f do
    If src host == dst host AND src layer2 Network
        != dst Layer2Network in f then
        Get src and dst VM from f1
        Calculate path between src and dst VM
            Get the Router Interface involved in path for src and dst Layer2
            Network
            If Router Interface is connected to Physical Device
            Then
            Add src and dst VM pair in result
            endif
    endif
end for
```

As an end result of the hairpins detection method, a list of VMs pairs that are causing hairpinned traffic with the recommendation of DLRs (and its routers) for resolving the hairpin. In one embodiment, a structured file of all the identified VMs pairs is exported to the host server manager so as to create all the required DLRs and routes which would make the network administrator's job easy.

At Step 633 of the workflow of one embodiment of the present invention, a process to alert a user on changes to critical VM to VM topologies is performed. To identify VMs of interest, the present invention uses two approaches. The first is based on the elephant flows the pair of VMs which communicate more frequently based on an application topology and the Second being the user providing the input as a pair of VMs which are important based on the application topology. Once a list of the pair of VMs is identified, in one embodiment, lookup tables are maintained to effectively generate the alerts for big picture impact of the small changes carried out to networking components.

In one embodiment, two separate lookup tables are maintained. In one lookup table a topologies-to-be-monitored information is kept. This table is where the key is pair of VMs, and value is VM-to-VM path topology graph. In order to identify each entry uniquely, a key like vm1-vm2 is created composed of the vm pair and the user who rested the alert. In the second lookup table, a nodes-to-be-monitored information is stored. This is a lookup table where the key is the UUID of a node from the VM to VM topology graph and value is list of all VM pairs for which the topology is to be monitored. In order to identify those nodes uniquely, the unique ID (uuid) is associated with each node. In one embodiment, the alert process in Step 634 is implemented by the code shown below:

```
for each pair of vms (candidate VMs) do
    Generate VM to VM path topology graph for candidate VMs (say
        vmToVM Graph
        Create an entry in Topologies-to-be-monitored lookup table for
            Candidates VMs and vmToVM Graph
            for each node(pnode) in vmToVMGraph do
                Add key of candidate VMs against pnode in
                    Node-to-be-watched-for-changes
            end for
end for
```

Still referring to FIG. 6B, at Step 635 when the collection component 510 of FIG. 5 pulls in new configuration information, alerts are generated to inform the user of changes in a node of interest. In one embodiment, at this step 635, the Network Topology Optimizer 399 checks if a component already exists in the components database and if it does, a difference in the contents of the old and the new component configuration information is created to determine if any attributes of the component has changed in the latest collection cycle (e.g., IP of a routed port might change, etc.). After storing the new version of the components to the component database, the Network Optimizer 399 uses a unique identifier of the component (UUID), to check if the component is a component of interest in the Node-to-be-watched-for-changes table. A representative code implementation of this feature is shown below as follows:

```
If UUID is found in Nodes-to-be-watched-for-changes table, then
    Find the associated VM pair (candidate VMs) and
    Topology (curPathTopology) from the Topologies-to-be-monitored table
    For candidate Vms, recompute the VM to VM topology graph
        (newPathTopology) using the latest version of the objects
    If curPathTopology and newPathTopology are different in terms of
      Nodes or edges then
            Send an alert to the user by the preferred mechanism
                (email,SNMP,etc.)
      end if
end if
```

At Step 636, a process to generate a list of migratable VMs is generated for implementation at Step 637. In one embodiment, at Step 637, the Network Topology Optimizer 399 identifies VMs which can be moved to the same VLANs to reduce the number of hairpins identified. In the process, a list of VMs along with the VLAN to which they should be moved so that their network latency is improved in generated. Since changing VAN would also entail changing the IP addresses (and possibly the DNS entry of the VM being moved), a list of all free-range IP addresses can be generated and stored for future reassignment. After the identified VMs have been moved, the DNS server and the network topology maps are updated at Step 637. In one embodiment, the VM migration process may be performed in the representative code below:

```
Initialize empty set to collect Pair of VMs that can be placed
On same L2 Network, say result
For each elephant flows (f) do
    If sr L2 Network != dst L2 Network then
        Get the Src and Dst VMs from f
            Add Src and Dst VMs pair in result
        end if
    end for
```

Additionally, embodiments of the present invention provide a network security system including a novel search feature for machines or components (including, but not limited to, virtual machines) of the computing environment. The novel search feature of the present security system enables ends users to readily assign the proper and scopes and services the machines or components of the computing environment. Moreover, the novel search feature of the present security system enables end users to identify various machines or components (including, but not limited to, virtual machines) similar to given and/or previously identified machines or components (including, but not limited to, virtual machines) when such machines or component satisfy a particular given criteria.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for automated optimization of network communications in a virtual computing environment, said method comprising:
    automatically monitoring communications between a plurality of communicating components, wherein said plurality of communicating components communicate over a plurality of different virtual local area networks of said virtual computing environment;
    generating existing network and component configurations information from network components in said virtual computing environment;
    generating network flow information in relation to said plurality of communicating components from said network components provided of said virtual computing environment;
    sanitizing the information collected from said generating existing network information and component configuration and said network flow information; and
    identifying component pairs of said plurality of communicating components communicating frequently within said virtual computing environment and over said plurality of different virtual local area networks from said sanitizing information collected in order to migrate said communicating component pairs in the same virtual networking environment to reduce communication latency between said communicating component pairs, and to identify hairpins in the communications between said component pairs of said plurality of communicating components in order to optimize network traffic by migrating said component pairs of said plurality of communicating components, wherein the identified hairpins is a network topology where the two communicating VMs are on the same host but the packets get routed on a virtual routing and forward (VRF) that is on a physical router owing to which the packet leaves the hosts and then re-enter it.

2. The computer-implemented method of claim 1, wherein said identifying component pairs, further comprises: compiling the virtual and the physical communication path between a plurality of virtual components of said computing network environment.

3. The computer-implemented method of claim 1, wherein said identifying component pairs further comprises: associating the network flow information with said computed path of said computing network environment.

4. The computer-implemented method of claim 3, wherein said migrating said frequently communicating component pairs, comprises: automatically generating a network topology of all said frequently communicating component pairs to identify the communicating paths with high latency in said computing environment.

5. The computer-implemented method of claim 4, wherein said migrating said frequently communicating component pairs of said components of said computing environment further comprises: computing the physical and virtual communication paths between said frequently communicating component pairs of said components of said computing environment.

6. The computer-implemented method of claim 5, wherein said migrating said frequently communicating component pairs of said components of said computing environment further comprises: performing a communication flow information enriching process of the communication flow identified in said frequently communicating components pair of said components in said network topology of said computing environment.

7. The computer-implemented method of claim 6, wherein said communication flow information enriching process further comprising: periodically repeating automated analysis of features in said computing environment to generate updated results of said automated analysis of said features of said components of said computing environment.

8. The computer-implemented method of claim 7, further comprising: associating network identifiers of said features of said components of said computing environment to said communication flow information.

9. The computer-implemented method of claim 1, wherein said network components comprises routing features of said computing environment.

10. The computer-implemented method of claim 9, wherein said network components further comprises switching features of said computing environment.

11. The computer-implemented method of claim 10, wherein said network component further comprises gateway features of said computing environment.

12. The computer-implemented method of claim 1, further comprising: automatically providing said results for said automated analysis of said features of said components of said computing environment without requiring intervention by a system administrator.

13. A computer-implemented method for reducing network hairpins in a virtual computing network environment, said method comprising:

monitoring network communications between components of said computing network environment;

identifying component pairs communicating over a plurality of network components located in different virtual local area networks in said computing network environment;

determining whether the communication flow between said component pairs is creating network latency in said computing environment;

generating a topology of said communicating component pairs; and migrating said communicating component pair to the same virtual local area network of said computing environment, and eliminating said hairpins in the communications between said component pairs in order to optimize network traffic by said migrating of said component pairs, wherein the eliminated hairpins is a network topology where the two communicating VMs are on the same host but the packets get routed on a virtual routing and forward (VRF) that is on a physical router owing to which the packet leaves the hosts and then re-enter it.

14. The computer-implemented method of claim 13, wherein said communication flow information includes the internet protocol (IP) address of said communicating component pair of said computing environment.

15. The computer-implemented method of claim 14, wherein said communicating flow information further comprises enriching said flow information by associating said IP address of said communicating component pairs to a virtual network interface card of said communicating component pairs of said computing environment.

16. The computer-implemented method of claim 13, wherein said flow information of said communicating component pairs is further enriched by associating the physical router and port serving a default gateway for said communicating component pair of said computing environment.

17. The computer-implemented method of claim 13, wherein said generating a topology of said communicating component pairs comprises identifying communicating pairs that communicate frequently than other components in said computing environment.

18. The computer-implemented method of claim 17, wherein said generating said topology of said communicating component pairs further comprises generating a lookup table with key identified communicating component pairs which frequently communicate in order to generates list of topologies to be monitored in said computing environment for latency resolution.

19. The computer-implemented method of claim 13, wherein said providing results of said method for said automated analysis of said features of said components of said computing environment further comprises: providing said results to a security system.

20. The computer-implemented method of claim 13, further comprising: periodically repeating said automated analysis of said communicating component pairs in said computing environment to generate updated results of said automated analysis of communication of said components of said computing environment.

* * * * *